United States Patent [11] 3,634,111

| [72] | Inventors | Gordon F. Foster Campbell; Guy E. Stong, Elmira, both of N.Y. |
|---|---|---|
| [21] | Appl. No. | 858,502 |
| [22] | Filed | Sept. 16, 1969 |
| [45] | Patented | Jan. 11, 1972 |
| [73] | Assignee | Corning Glass Works Corning, N.Y. |

[54] GLASS-CERAMIC CEMENTS COMPRISING SILICON CARBIDE
1 Claim, No Drawings

[52] U.S. Cl. .................................................. 106/40 R,
65/22, 65/33, 65/43, 106/39 DV, 106/52, 161/192
[51] Int. Cl. ........................................................ C04b33/00,
C03c 27/00
[50] Field of Search ............................................. 106/39 DV, 40, 39, 52; 65/22, 33, 43; 161/192; 264/43

[56] References Cited
UNITED STATES PATENTS

| 2,920,971 | 1/1960 | Stookey | 106/39 |
| 3,112,184 | 11/1963 | Hollenbach | 106/39 X |
| 3,189,512 | 6/1965 | Stong | 161/192 |
| 3,246,972 | 4/1966 | Smith | 106/39 X |
| 3,251,403 | 5/1966 | Smith | 106/39 X |
| 3,272,686 | 9/1966 | Smith et al. | 106/40 X |

*Primary Examiner*—James E. Poer
*Assistant Examiner*—W. R. Satterfield
*Attorneys*—Clarence R. Patty, Jr. and Clinton S. Janes, Jr.

ABSTRACT: This invention relates to the manufacture of thermally stable, structurally strong, foaming cements from $TiO_2$- nucleated, lithium aluminosilicate glass-ceramic materials through the addition of SiC thereto. These cements are essentially free from PbO, $So_3$, and fluoride; have coefficients of thermal expansion (25°–800° C.) between about zero to 10 $\times 10^{-7}$°C.; demonstrate excellent long time dimensional stability at temperatures up to 800° C. and very good dimensional stability at temperatures up to 1,000° C.; and exhibit good chemical durability.

GLASS-CERAMIC CEMENTS COMPRISING SILICON CARBIDE

This invention is principally concerned with the joining together of two ceramic bodies having low coefficients of thermal expansion. The special application to which the products of this invention are particularly useful involves the construction of heat exchangers for use in automobile and truck engines. These articles are comprised of a ceramic honeycomb body affixed within a solid ceramic rim. Such a structure requires a strong seal to be developed between the ceramic rim and the ceramic material constituting the honeycomb body. Attempts to seal these two elements into an integral composite without the use of a cement have failed due to the shrinkage obtaining during firing which results in cracks occurring in the ceramic ring or breakage of the thin-walled honeycomb material. The complex honeycomb configuration coupled with this firing shrinkage have ruled out the utilization of conventional-type cements inasmuch as the spaces between the bodies will not remain filled after firing of the cement at the necessary elevated temperatures. Therefore, cements have been developed which foam upon firing giving a structurally sound continuous bond.

U.S. Pat. No. 3,189,512 granted to one of the present applicants discloses the production of foaming cement compositions which have been employed in sealing the ceramic rim to the honeycomb body of a heat exchanger. Those cements contained about 1–16% PbO, 1–15% fluoride and oxide fluxes, 1–6% SiC and/or $SO_3$, and the remainder essentially all a crystalline lithium aluminosilicate material, the working examples disclosing the mineral petalite as the crystalline material although the utility of glass-ceramic materials having a lithium aluminosilicate base composition is also described. Nevertheless, whereas those cements have been used commercially, the chemical durability thereof left much to be desired and, even more importantly, the dimensional stability thereof at temperatures of about 800° C. and greater (the use temperatures encountered in actual service of the heat exchangers) was not satisfactory. Such instability led to the development of cracks in the seal and early breakdown of the composite unit.

Therefore, the primary object of this invention is to provide foaming cements having low coefficients of thermal expansion, good chemical durability, and excellent long time dimensional stability at temperatures of 800° C. and higher which can fill any gap between the rim and the honeycomb yielding a structurally sound bond therebetween.

This object of the invention can be achieved through cements consisting essentially of $TiO_2$-nucleated glass-ceramic materials having a lithium aluminosilicate composition base with about 0.25–5% SiC incorporated therewith.

In carrying out the invention, a glass-forming batch of a desired lithium aluminosilicate composition is melted and the melt cooled to a glass body, this cooling often comprising running a stream of the melt into water to cause the formation of many small particles of glass. The glass is thereafter crushed to at least pass through a 200 Tyler mesh screen and, preferably, through a 325 Tyler mesh screen. The powdered glass in then mixed with the SiC, also in powdered form. The crushing and mixing can be undertaken in either the wet or dry state.

The mixture of glass frit and SiC can be applied dry but, more desirably, a slurry thereof is made in water or an inert organic liquid such as xylene, toluene, butyl alcohol, and the like. This slurry of cement and liquid is poured into the spaces at the place of joinder. With the composite heat exchanger units, simple pouring has been found to be adequate. However, where the cement is to be used in other applications, the manner of applying the cement is deemed to be well within the technical competence of an artisan in the ceramic arts. For example, a material of a puttylike consistency can be made from a mixture of Methocel and water which may then be laid on as with a trowel. Methocel is a product of the Dow Chemical Company consisting of hydroxypropyl methylcellulose.

The cements of this invention require firing temperatures of about 1,200°–1,400° C. to foam and sinter to be ceramic parts. Generally, a firing time of at least about one-fourth hour is necessary to attain satisfactory sintering with 4 hours normally being employed to ensure a strong bond. Although firing times as long as 24 hours did not deleteriously affect the cement, such schedules are uneconomical since they usually do not improve the quality of the bond sufficiently to warrant the added expense. Therefore, a 12-hour sintering period has been considered to be a practical maximum. It will be appreciated that the liquid vehicle of the slurry will desirably be driven off first at temperatures of about 100°–300° C. and then the assemblage heated to the sintering temperature.

Although the mechanism inducing the foaming of the instant cements is not completely understood, it is believed that the $TiO_2$ present is reduced during the firing step with the concomitant oxidation of the SiC to silica and carbon dioxide. The release of the gaseous $CO_2$ produces the foaming action.

The firing schedule utilized is dependent upon the elements to be joined together, as will be apparent to those skilled in the art. In the case of heat exchanger fabrication, after the cement slurry has been poured into the spaces at the place of joinder between the solid rim and the honeycomb body, the composite unit is transferred to a heating chamber wherein it is first heated to between 100°–200° C. to drive off the slurry vehicle. Thereafter, the assemblage is heated at a rate not exceeding about 10° C./minute up to the sintering range of 1,200°–1,400° C. Following the sintering firing, the then integral unit is carefully cooled to room temperature at a rate not exceeding about 5° C./minute and, preferably, less than about 100° C./hour.

These cements are characterized by a low average coefficient of thermal expansion over the range 25°–800° C. of about $0-10 \times 10^{-7}/°$ C. The thermal expansion curve actually demonstrates a modest negative expansion at lower temperatures within the range and then rises to result in the average figure noted above. As is well known in the art, there must be no material mismatch in thermal expansion between the cement and the articles to be joined together or internal stresses developing therefrom will shorten the life of the seal.

The manner of fabricating the heat exchanger units for which the cements of this invention are particularly suitable comprises no part of the invention since methods therefor are well known to the art. Hence, for example, the solid ceramic rim can be slip cast in the conventional manner and the honeycomb body can be made in accordance with U.S. Pat. No. 3,112,184. That patent describes a process wherein a mixture of pulverized ceramic and a binder is applied to a thin flexible carrier. The coated carrier is crimped to a desired corrugated-type configuration and then fabricated into a suitable body, e.g., by winding the crimped carrier around a core to yield a cylindrically shaped article. The shaped article is thereafter fired to burn out the binder and carrier and sinter the ceramic particles to a unitary structure.

Table I records the compositions of several glasses which, when properly heat treated, will yield glass-ceramic materials suitable for this invention. To ensure low coefficient of thermal expansion, excellent long time thermal dimensional stability, and good chemical durability, the glass composition and the heat treatment thereof should yield a beta-spodumene solid solution crystallization with, frequently, a minor amount of mullite, this crystallization comprising at least 75 percent, and, preferably, greater than 90 percent, of the body. The high crystallinity assures the absence of a large amount of a glassy phase, what residual glassy phase remaining being very high melting, i.e., normally a highly siliceous glass. In general, the operable glasses of the invention will consist essentially of about 2.5–7% $Li_2O$, 10–30% $Al_2O_3$, 58–80% $SiO_2$, and 0.25–5% $TiO_2$. The best thermal dimensional stability is achieved where the glass consists of the above four components only but improvements in melting, forming, and in chemical durability can be had where minor amounts of compatible metal oxides such as ZnO, MgO, CaO, $ZrO_2$, $B_2O_3$, and the alkali metal oxides $Na_2O$ and $K_2O$ are present. ZnO is an especially useful additive as a melting aid and stabilizing the coefficient of thermal expansion at a low figure. However, whereas amounts of ZnO up to about 15 percent have been utilized, its inclusion in such quantity substantially reduces the service temperatures to which the cement can be used. The alkali metals are highly fluxing and the total thereof should be kept below 1 percent by weight. The development of crystal phases other than beta-spodumene solid solution and mullite commonly has a severely adverse effect upon the dimensional stability of the cement. Therefore, the total additions of such oxides as MgO, CaO, and $B_2O_3$ should not exceed about 2 percent by weight. Therefore, whereas ZnO may be tolerated in amounts up to about 15 percent by weight, the total of all other additions should be maintained below about 5 percent by weight. PbO, $SO_3$, and fluoride are not only strong fluxes but have an extremely detrimental effect upon the long time thermal dimensional stability of the product and, hence, the cement compositions ought to be essentially free from these constituents.

The glass compositions recited in table I are reported in terms of weight percent on the oxide basis. The batch ingredients therefor may comprise any materials, either the oxides or other compounds, which, when melted together, will be converted to the oxides in the proper proportions. Arsenic may be present as a fining agent.

TABLE I

|  | 1 | 2 | 3 |
|---|---|---|---|
| $SiO_2$ | 72.0 | 71.9 | 69.7 |
| $Al_2O_3$ | 17.7 | 23.0 | 17.7 |
| $Li_2O$ | 4.5 | 5.1 | 2.7 |
| $TiO_2$ | 4.3 | — | 4.7 |
| MgO | 0.3 | — | 2.7 |
| ZnO | 0.1 | — | 1.0 |
| $Na_2O$ | 0.3 | — | 0.4 |
| $ZrO_2$ | — | — | 0.3 |
| $As_2O_3$ | 0.8 | — | 0.8 |

Batches for the above glasses were melted in open platinum crucibles at temperatures of about 1,600°–1,650° C. for about 16 hours to ensure a homogeneous melt. The melts were poured as a fine stream into water to yield very fine particles of glass. The glass particles were then ballmilled to pass a 325 mesh Tyler screen.

Table II records the batch compositions in parts by weight of the actual components used and an analysis of the fired product in weight percent on the oxide basis. Also tabulated are the sintering temperature utilized, the coefficient of thermal expansion (25°–800° C.) of the final cement, and dimensional stability measurements at 800° C. and 1,050° C. of the several cements.

Samples were prepared by dry milling the powdered glass with powdered SiC with or without other additions. The mixture was packed into slotted refractory bricks lined with Fiberfrax and fired. After firing, the coefficient of thermal expansion of each product was determined with a differential dilatometer and the change in length thereof with a supermicrometer.

These products demonstrate a very favorable comparison with the cements produced in accordance with U.S. Pat. No. 3,189,512. One such cement which has been used commercially is prepared by first fusing together a mixture of 16.9 parts by weight of petalite and 1.9 parts by weight of white fumed lead (83.5% $PbSO_4$ and 16.5% PbO) to yield a glass containing about 8 percent by weight PbO and 2.9 percent by weight $SO_3$. This glass is then ground very finely and thoroughly mixed together with other powdered ingredients to provide a batch consisting of:

|  | Parts by Weight |
|---|---|
| Glass | 100 |
| ZnO | 10.1 |
| $CaF_2$ | 1.5 |
| SiC | 4.0 |

This batch was packed into slotted refractory bricks lined with Fiberfrax and fired at 1,100° C. for 1 hour. The fired product was analyzed, in weight percent on the oxide basis, as follows:

| $SiO_2$ | 65.23% |
|---|---|
| $Al_2O_3$ | 12.62 |
| $Li_2O$ | 3.58 |
| PbO | 6.79 |
| $SO_3$ | 1.94 |
| ZnO | 8.56 |
| CaO | 0.91 |
| F | 0.62 |

The average coefficient of thermal expansion (25°–800° C.) of the foamed cement was about $14\times10^{-7}$/°C. After soaking at 800° C. for 6 weeks, the product expanded about 700 parts per million. Hence, inasmuch as the overall change in length exhibited by the articles formed in accordance with the instant invention after long time exposures to temperatures up to 800° C. has been found to be less than 100 parts per million, the dimensional stability of these cements is at least an order of magnitude better than the cements made in accordance with that patent. Also, the acid durability of the instant cements has been determined to be at least one order of magnitude superior to that of cements produced following the method of that patent. Such improvements are of real significance in markedly extending the service life of the heat exchanger units.

We claim:

1. A foaming cement for joining together ceramic members, said cement, after firing, having an average coefficient of thermal expansion over the temperature range 25°–800° C. of about $0–10\times10^{-7}$/°C. and exhibiting a change of length of less than about 100 parts per million after long time exposure to temperatures up to about 800° C., which has a batch composition consisting of about 0.25–5% SiC and the remainder substantially all a glass consisting essentially, by weight on the oxide basis, of about 2.5–7% $Li_2O$, 10–30% $Al_2O_3$, 58–80% $SiO_2$, and 0.25–5% $TiO_2$, said glass being essentially free from PbO, $SO_3$, and fluoride.

TABLE II

| Example No. | Batch, parts by weight | Product analysis, percent | Sintering temperature | Thermal expansion | Dimensional stability |
|---|---|---|---|---|---|
| 1 | Glass No. 1 10, ZnO 1.5, SiC 0.4. | $SiO_2$ 64.35, $Al_2O_3$ 14.67, $Li_2O$ 3.73, $TiO_2$ 3.60, ZnO 12.50, $As_2O_3$ 0.66, $Na_2O$ 0.24, MgO 0.21. | 1,200° C. for 4 hours | $2.9\times10^{-7}$/° C. | After 6 wks. at 800° C., expanded 50 parts/million. After 6 wks. at 1,050° C., expanded 75 parts/million. |
| 2 | Glass No. 2 10, Glass No. 3 4.5, Sand 4.5, SiC 0.1. | $SiO_2$ 78.21, $Al_2O_3$ 16.17, $Li_2O$ 3.30, $TiO_2$ 1.10, ZnO .23, $As_2O_3$ .19, $Na_2O$ .09, MgO .63. | 1,310° C. for 10 hours | $3.7\times10^{-7}$/° C. | After 6 wks. at 800° C., shrank 50 parts/million. After 6 wks. at 1,050° C., expanded 100 parts/million. |
| 3 | Glass No. 2 10, $Al_2O_3$ 2, Sand 2, ZnO 0.9, $TiO_2$ 0.4, SiC 0.05. | $SiO_2$ 60.26, $Al_2O_3$ 27.97, $Li_2O$ 3.32, $TiO_2$ 2.60, ZnO 5.85. | 1,310° C. for 10 hours | $4.9\times10^{-7}$/° C. | After 6 wks. at 800° C., expanded 25 parts/million. After 6 wks. at 1,050° C., expanded 75 parts/million. |
| 4 | Glass No. 2 10, Glass No. 3 1.0, ZnO 0.9, SiC 0.1. | $SiO_2$ 66.70, $Al_2O_3$ 20.56, $Li_2O$ 4.46, $TiO_2$ 0.39, ZnO 7.55, $As_2O_3$ .07, $Na_2O$ .03, MgO .22. | 1,310° C. for 10 hours | $0.5\times10^{-7}$/° C. | After 6 wks. at 800° C., expanded 50 parts/million. After 6 wks. at 1,050° C., shrank 50 parts/million. |